(No Model.)
A. W. KRAUSE.
SELF MEASURING TANK.
No. 597,116. Patented Jan. 11, 1898.
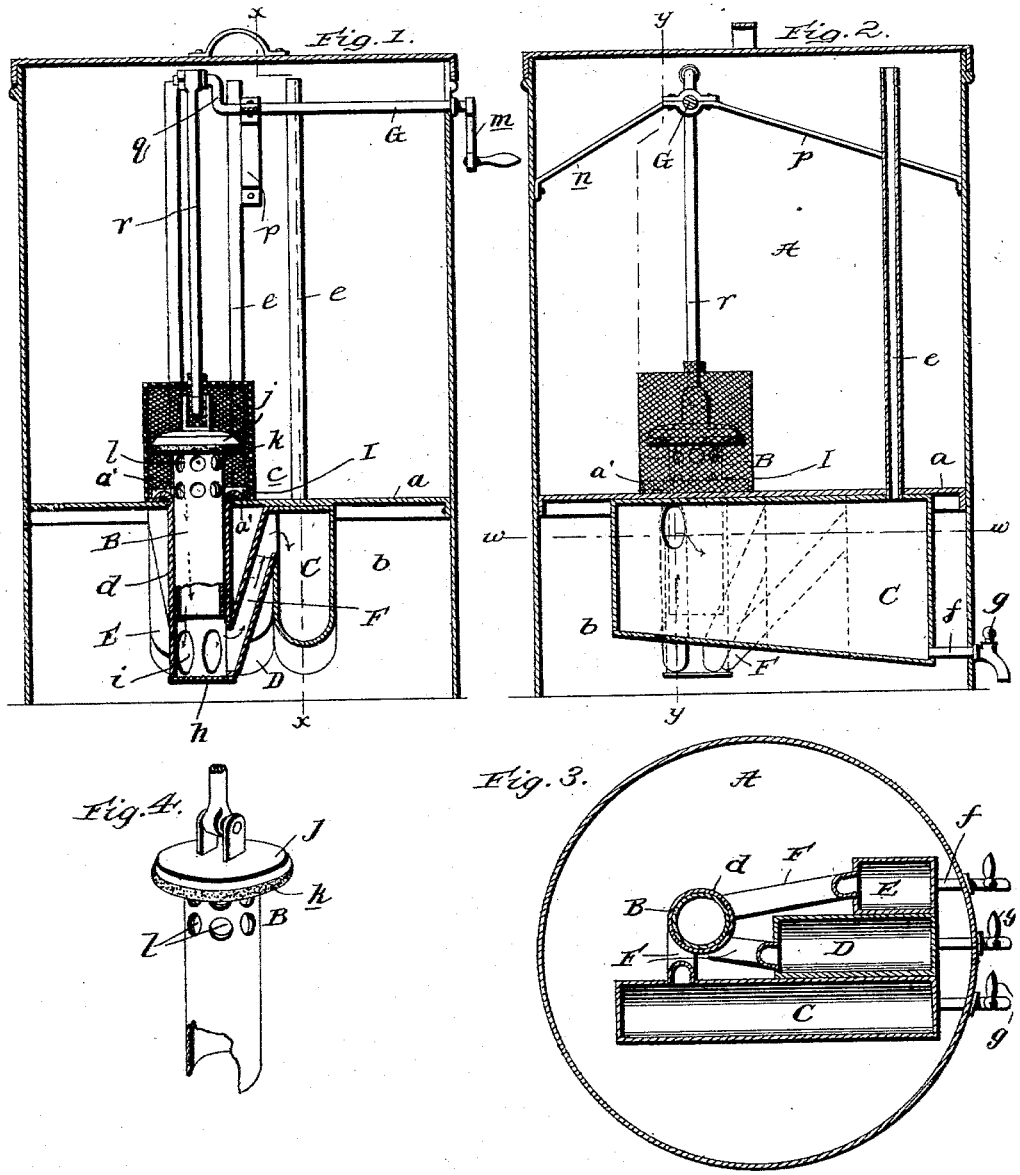

UNITED STATES PATENT OFFICE.

AUGUST W. KRAUSE, OF LOS ANGELES, CALIFORNIA.

SELF-MEASURING TANK.

SPECIFICATION forming part of Letters Patent No. 597,116, dated January 11, 1898.

Application filed August 11, 1897. Serial No. 647,814. (No model.)

*To all whom it may concern:*

Be it known that I, AUGUST W. KRAUSE, a citizen of the United States, residing at Los Angeles, in the county of Los Angeles and State of California, have invented certain new and useful Improvements in Self-Measuring Tanks; and I do declare the following to be a full, clear, and exact description of the invention, such as will enable others skilled in the art to which it appertains to make and use the same.

This invention relates to improvements in self-measuring vessels for dispensing oil and other liquids; and the many objects and advantages of the invention will appear from the following description and claims when taken in connection with the annexed drawings, in which—

Figure 1 is a vertical sectional view taken in the plane indicated by the dotted line $y\,y$ on Fig. 2. Fig. 2 is a similar view taken in the plane indicated by the dotted line $x\,x$ on Fig. 1. Fig. 3 is a cross-sectional view taken in the plane indicated by the dotted line $w\,w$ on Fig. 2, and Fig. 4 is a perspective view of the valve.

Referring by letter to said drawings, A indicates the tank, which may be of any suitable capacity and made of sheet metal or other suitable material. Within this tank and at a suitable altitude I preferably provide a bottom or horizontal partition $a$, so as to leave a chamber or space $b$ below the liquid-chamber of the tank. This bottom wall is provided with a vertical aperture $c$, and depending from the same is a cup or receptacle $d$, which is designed to receive the oil or other liquid from the tank and serve the additional function of a casing for the valve B.

Arranged beneath the bottom wall $a$ are the measuring vessels C, D, and E, which may be graduated, so that each may hold a predetermined quantity of liquid. Each measuring vessel is vented by a vertical pipe $e$, which passes out from the top of the respective vessels through the wall $a$ and has the upper end carried above the oil in the tank. Each vessel is also provided with a draw-off pipe $f$, which passes from the lowest portion in the front of said vessels out through the tank wall or casing and provided with a cock $g$. It will be observed that each measuring vessel has its bottom pitched from its inner to its outer end, where it is tapped by the draw-off pipe, so that the entire contents of each vessel may be drawn off at every operation. The cup or receptacle $d$, which is shown as of a cylindrical form, is provided at its lower end, which is closed by a cap $h$, with lateral openings $i$, there being one for each measuring vessel, and said vessels are connected with the cup or receptacle by means of vertically inclined or oblique pipes F, which lead from said lateral openings to an opening at the upper end of each vessel.

The valve B, which is of tubular form in cross-section, is provided at its upper end with a head $j$, and this head is faced on its under side with leather $k$ or other suitable material designed to form a tight joint between the head and the upper side of the wall $a$ of the tank when said head has been seated thereon. The valve is designed to move vertically within the cup or receptacle $d$, and it is provided below its head with lateral holes $l$ for the passage of oil or other liquid from the tank into the cup beneath. The valve may be raised and lowered by any suitable means. In the present illustration I have shown a shaft G journaled in the tank and provided at its outer end with a handle $m$, whereby it may be turned in its bearings. The shaft is also supported in arms $n$ and $p$, and its inner end is cranked, as shown at $q$, to receive the upper end of a pitman $r$, the opposite end of which is connected with the head of the valve, as shown. In operation it will be seen that the valve may be raised and lowered by the manipulation of the handle on the shaft G, and when the valve has been raised, as shown in Fig. 1 of the drawings, the oil or other liquid will pass from the tank through the holes $l$ in the tubular stem of the valve and down through the course indicated by the arrows into the cup or receptacle, and from thence through the lateral apertures up through the pipes F and into the respective measuring vessels, filling all at the same operation. When it is desirable to draw off from any one or more of the measures, the valve B should be lowered, so as to close communication between the tank and the cup or receptacle $d$. When the measuring vessels are not in use, the valve B may remain open, so that the measuring vessels will always be kept filled, thus avoiding the delay which would be necessary to fill the measures when desired to draw off any quantity.

It will be noticed that in virtue of the employment of the vertically-oblique pipes F between the cup or receptacle $d$ and the upper ends of the several measuring vessels, only the amount of liquid in each measuring vessel will be discharged when the draw-off cock thereof is opened, and that the cup or receptacle $d$ and the pipes F will always be full of liquid, and in consequence when the valve B is opened the filling of the measuring vessels will be facilitated. It will also be noticed that one measuring vessel—the vessel C, for instance—may be repeatedly filled and emptied without drawing from the other measuring vessels, all of the vessels being filled by the liquid passing through the cup or receptacle $d$ and the pipes F.

In order to prevent the passage of any foreign substances or impurities from the tank into the measuring vessels, I provide a guard I, which may be composed of wire-gauze, perforated metal, or other suitable material. This guard extends a sufficient distance above the wall $a$ of the tank to offer no obstruction to the free movement of the valve and may seat over a flange $a'$, as shown.

The vent-pipes $e$ will afford convenient means for the introduction of a wire or the like in cleaning the measuring vessels should the same become obstructed by sediment or any foreign substance which may possibly enter.

The tank is provided with a suitable cover, and while I have shown but three measuring vessels yet I do not wish to be understood as confining myself to the employment of any particular number, as one, two, three, or more may be used.

Having thus described my invention, what I claim is—

1. The combination of the tank, the cup or receptacle depending from the tank and having the lateral apertures at its lower end, a plurality of measuring vessels arranged below the tank and each having a draw-off cock, the pipes extending upwardly from the apertures of the cup or receptacle and connecting said apertures and the upper ends of the measuring vessels, and a single valve arranged in the cup or receptacle for controlling communication between the interior of the tank and the lateral apertures of the cup or receptacle and consequently communication between the interior of the tank and the interior of the several measuring vessels, substantially as specified.

2. The combination with the tank; of the cup or chamber depending therefrom and provided with the lateral apertures at or near its base, the vertically-movable valve having a tubular stem provided with lateral apertures, measuring vessels arranged below the tank and provided with draw-off cocks, and the pipes arranged vertically oblique and connecting the tops of the measuring vessels with the base of the cup or receptacle, substantially as specified.

3. The combination with the tank; of the measuring vessels arranged below the same and provided with inclined bottoms, the vent-pipes rising from the vessels, the cup or chamber depending from and communicating with the tank and provided at its base with lateral apertures, the pipes connecting the vessels with said cup or chamber, the valve having the tubular stem and also provided with lateral apertures, the operating-shaft having the handle at one end, and the pitman connecting the opposite end of said shaft with the valve, substantially as specified.

In testimony whereof I affix my signature in presence of two witnesses.

AUGUST W. KRAUSE.

Witnesses:
J. H. BURKE,
F. H. WHITE.